(12) United States Patent
Walsh et al.

(10) Patent No.: US 8,998,384 B2
(45) Date of Patent: Apr. 7, 2015

(54) CIRCUITS AND METHODS USING A NON-GOLD CORROSION INHIBITOR

(75) Inventors: Lynn Walsh, Dublin (IE); Mark Walsh, Dublin (IE); Ronald L. Imken, Round Rock, TX (US); Soon Yeng Chan, Singapore (SG); Alejandro Aldrin A. Narag, II, Singapore (SG)

(73) Assignees: Hewlett-Packard Development Company, L.P., Houston, TX (US); 3M Innovative Properties Company, Austin, TX (US)

( * ) Notice: Subject to any disclaimer, the term of this patent is extended or adjusted under 35 U.S.C. 154(b) by 678 days.

(21) Appl. No.: 13/077,123

(22) Filed: Mar. 31, 2011

(65) Prior Publication Data

US 2012/0249659 A1 Oct. 4, 2012

(51) Int. Cl.

| | |
|---|---|
| *B41J 2/14* | (2006.01) |
| *B41J 2/04* | (2006.01) |
| *B41J 2/05* | (2006.01) |
| *B41J 2/16* | (2006.01) |
| *B23K 1/00* | (2006.01) |
| *B23K 1/20* | (2006.01) |

(52) U.S. Cl.
CPC .......... *B41J 2/14072* (2013.01); *B41J 2/14201* (2013.01); *B41J 2/1601* (2013.01); *B41J 2/1607* (2013.01); *B41J 2/1623* (2013.01); *B41J 2002/14491* (2013.01); *B23K 1/0016* (2013.01); *B23K 1/203* (2013.01)

(58) Field of Classification Search
None
See application file for complete search history.

(56) References Cited

U.S. PATENT DOCUMENTS

| | | | |
|---|---|---|---|
| 6,142,609 A * | 11/2000 | Aoki | 347/50 |
| 6,825,120 B1 | 11/2004 | Liu et al. | |
| 6,933,614 B2 * | 8/2005 | Lee et al. | 257/780 |
| 7,244,370 B2 * | 7/2007 | Sasaki et al. | 216/27 |
| 7,468,100 B2 | 12/2008 | Taga et al. | |
| 7,550,046 B2 | 6/2009 | Xia et al. | |
| 7,696,102 B2 | 4/2010 | Zhang | |
| 7,833,900 B2 | 11/2010 | Leong et al. | |
| 7,838,776 B2 | 11/2010 | Lauffer et al. | |
| 2002/0030252 A1 * | 3/2002 | Emoto | 257/666 |
| 2003/0041455 A1 * | 3/2003 | Akhavain et al. | 29/890.1 |
| 2003/0211425 A1 * | 11/2003 | Mao et al. | 430/311 |
| 2004/0209443 A1 | 10/2004 | Cadieux et al. | |
| 2010/0101840 A1 | 4/2010 | Hampp et al. | |

FOREIGN PATENT DOCUMENTS

JP     61103843     5/1996

OTHER PUBLICATIONS

R. Walker, "The use of benzotriazole as a corrosion inhibitor for copper", Sep. 1970, pp. 9-15, vol. 17, Issue 9, Published by MCB UP Ltd.

* cited by examiner

*Primary Examiner* — Geoffrey Mruk
(74) *Attorney, Agent, or Firm* — Brooks, Cameron & Huebsch, PLLC (57) ABSTRACT

A circuit can include a die configured to electronically control particular elements and a flex circuit having copper leads coated with a non-gold corrosion inhibitor, the flex circuit being electrically connected to the die by the copper leads.

10 Claims, 6 Drawing Sheets

CIRCUITS AND METHODS USING A NON-GOLD CORROSION INHIBITOR

BACKGROUND

Gold is used in the field of electronics for coating electrical connections on two separate portions of an electrical circuit to enable secure and reliable bonding of the electrical connections with low resistivity and to confer low susceptibility to corrosion (e.g., relative to copper, aluminum, etc.). For instance, such gold-coated electrical connections can be found on a die (e.g., at particular positions on the die) and on a flex circuit (e.g., on leads) that are to be bound together to form an interconnect circuit. In some circumstances, the completed interconnect circuit can be attached to another component as an electronic control component in an electronic device.

Gold is an expensive element and coating with gold is a high maintenance process, each of which increases the cost of electronic devices when gold is used therein. As such, reducing the amount of gold used in the electronic device would be cost-effective. However, replacing gold on either or both sides of a bond with other elements that have low resistivity (e.g., copper, aluminum, etc.) can introduce potential problems before and after manufacturing the electronic device.

DETAILED DESCRIPTION

A gold coating of electrical connections on two separate portions of an electrical circuit to be bonded can be replaced with a coating on one or both of the portions with other elements that have low resistivity, for example, copper. Alternatively, gold coating of either or both of the electrical connections can be omitted such that the underlying element remains exposed for bonding. However, potential problems before and after manufacturing the electronic device can result from replacing or omitting the gold.

For instance, such elements, or alloys thereof, can be more susceptible to corrosion (e.g., by reacting with oxygen and/or water) than gold, or alloys thereof. Hence, corrosion of an element to be used in the bond instead of a gold coating on at least one of the electrical connections may compromise functionality of the electrical circuit before and after manufacturing the electronic device. Corrosion of the replacement element in the bond can, for example, reduce the ability to securely and reliably bond the electrical connections, increase the resistivity of the electrical connection formed from or coated with the replacement element before being bonded to the separate portion of the electrical circuit (e.g., copper leads to be bonded to gold connection points), and/or increase the resistivity of the electrical circuit after bonding, among other effects.

The present disclosure includes, amongst a number of other possible applications, an ink ejection device that includes a semiconductor die configured to control ink ejection elements and a flex circuit having copper leads coated with a non-gold corrosion inhibitor, the flex circuit being electrically connected to the semiconductor die by the copper leads to form an interconnect circuit. The copper leads can be coated with a non-gold corrosion inhibitor that includes BTA (e.g., as at least one solute in a polar solvent).

BTA is designated by a number of terms, including benzotriazole, H-benzotriazol, and 1, 2, 3-benzotriazol. BTA molecules feature two fused aromatic rings that can form a heterocyclic compound with the formula $C_6H_4N_3H$. BTA can be a colorless solid that is soluble in polar solvents, including water. BTA molecules can bond to a number of elements, including copper.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure. It is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

Figure 1:
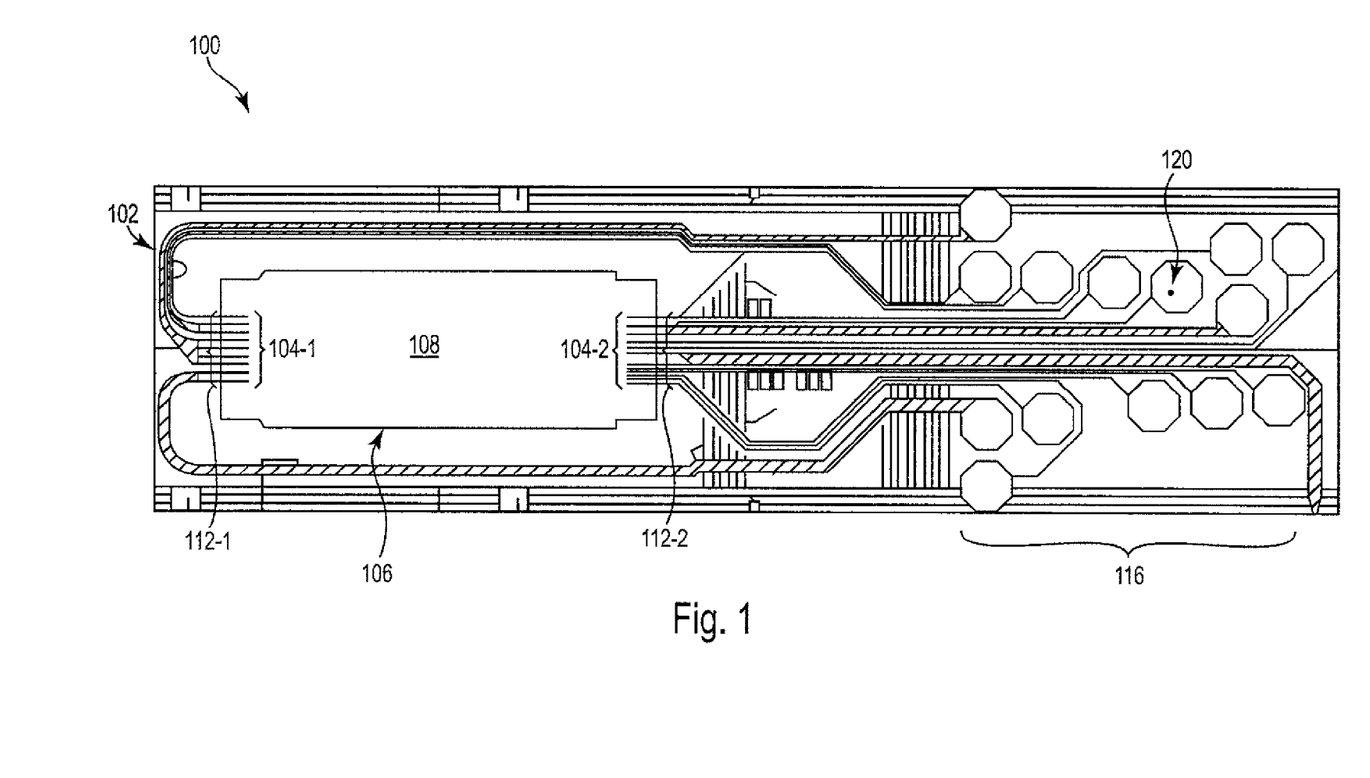
FIG. 1 illustrates an example of a circuit according to the present disclosure.

FIG. 1 illustrates an example of a circuit according to the present disclosure. FIG. 1 illustrates an interconnect circuit 100 that can include a flex circuit 102 having a number of copper leads to be bonded to gold electrical connection points on a die configured for electrical control of elements of an electronic device. For example, the flex circuit 102 illustrated in FIG. 1 shows two groups of BTA-coated copper leads 104-1, 104-2 located at two sides of a window 106 (e.g., an opening through the flex circuit 102). The two groups of BTA-coated copper leads 104-1, 104-2 protrude into the window 106 to enable bonding to a die 108 that is at least partially covered by the flex circuit 102. For example, the window 106 can be aligned with a die and permit circuitry to be interconnected therethrough, such as with a semiconductor die configured to control ink ejection elements in an ink ejection device. Such a semiconductor die can, for example, include gold electrical connection points each having an exposed area in a range of from 550 to 1400 square micrometers on the die.

The groups of BTA-coated copper leads 104-1, 104-2 illustrated in FIG. 1 are shown to have traces 112-1, 112-2 that extend from the window 106 to a section separate from the copper leads 104-1, 104-2 that has a number of copper electrical contact pads 116 configured to provide electrical input for the interconnect circuit 100. By way of example and not by way of limitation, an area of corrosion 120 is shown on one of the number of copper electrical contact pads 116. To reduce the likelihood and/or the consequences of such corrosion, the copper electrical contact pads 116 can be coated with BTA similar to the coating of the copper leads 104-1, 104-2 (e.g., with a monolayer of BTA molecules).

Figure 2A:
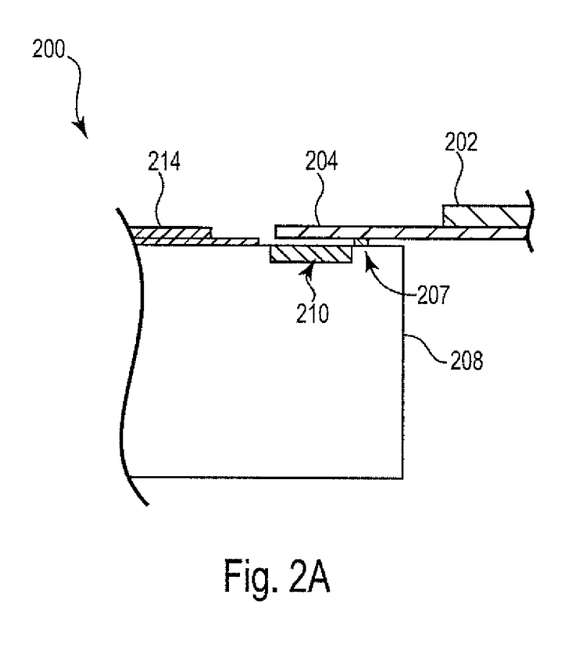
FIGS. 2A and 2B illustrate an example of a circuit bonded using a benzotriazole (BTA)-coated copper lead according to the present disclosure.
Figure 2B:
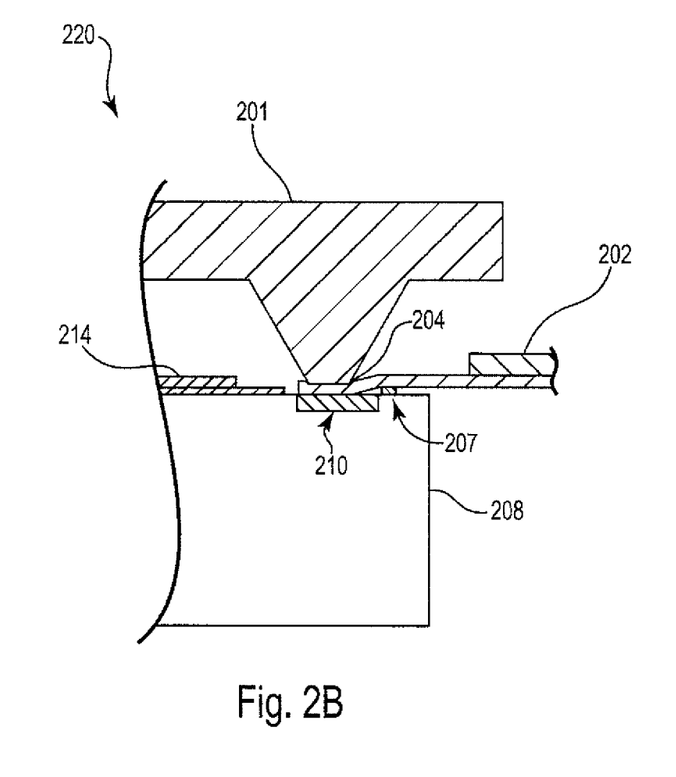

FIGS. 2A and 2B illustrate an example of a circuit bonded using a BTA-coated copper lead according to the present disclosure. FIG. 2A illustrates a bond site cross-section 200 that shows an example of a BTA-coated copper lead 204 extending from a flex circuit 202 and aligned with a gold electrical connection point 210 on a die 208 before the BTA-coated copper lead 204 is bonded to the gold electrical connection point 210. In some embodiments, the die 208 can include a projection 207 to facilitate bonding of the BTA-coated copper lead 204 to the gold electrical connection point 210 (e.g., by serving as a fulcrum to bend the BTA-coated copper lead 204 toward the gold electrical connection point 210). An orifice plate 214 having a number of elements can be positioned over an area of the bond site to be shielded during bonding of the BTA-coated copper lead 204 to the gold electrical connection point 210.

Depending on particular applications, the copper leads can be formed from pure copper (e.g., as pure as commercially available) or various alloys of copper with a number of other elements (e.g., copper and aluminum in particular proportions). Similarly, the gold electrical connection points can be formed from pure gold (e.g., as pure as commercially available) or various alloys of gold with a number of other elements (e.g., gold with copper, palladium, and/or silver in particular proportions).

A bond pad (not shown) can be positioned on the die under each gold electrical connection point to carry electrical signals to and from the interconnect circuit formed by bonding the copper lead to the gold electrical connection point. For example, the interconnect circuit 100 shown in FIG. 1 can include various circuitry in the flex circuit 102 and the die 108, and/or be connected with other circuitry, associated with electrical signals to ink ejection elements of an ink ejection device controlled by circuitry of the die 108. The bond pads can be formed from pure elements having low resistivity (e.g., as pure as commercially available) or various alloys of such with a number of other elements (e.g., 99.5% aluminum and 0.5% copper, among various other combinations in particular proportions).

FIG. 2B illustrates a bond site cross-section 220 that shows an example of a bond tool 201 applying pressure to the BTA-coated copper lead 204 extending from the flex circuit 202 and aligned with the gold electrical connection point 210 on the die 208 while the BTA-coated copper lead 204 is being bonded to the gold electrical connection point 210. As shown in FIG. 2B, the projection 207 on the die 208 can facilitate bonding of the BTA-coated copper lead 204 to the gold electrical connection point 210 by serving as a fulcrum to bend the BTA-coated copper lead 204 toward the gold electrical connection point 210. During bonding, the orifice plate 214 having the number of elements can be positioned over the area of the bond site to be shielded during bonding of the BTA-coated copper lead 204 to the gold electrical connection point 210.

Figure 3:
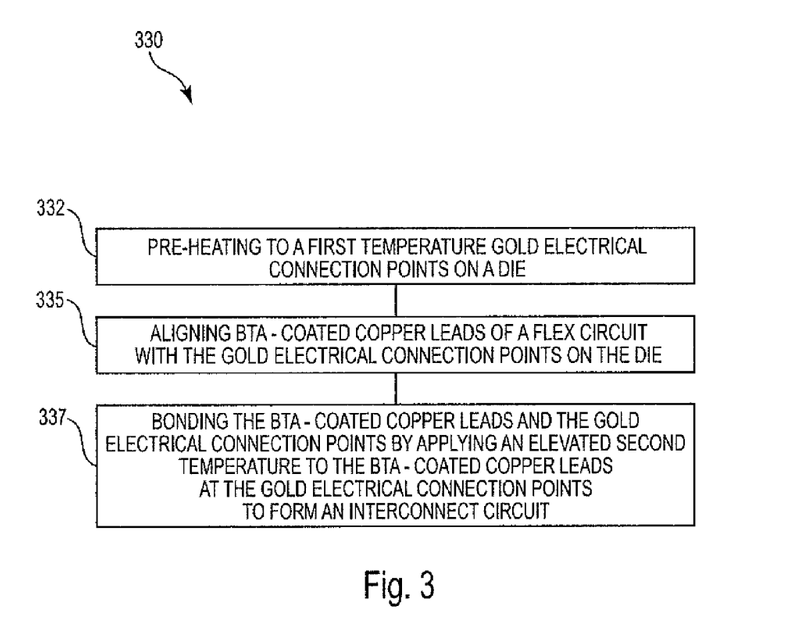
FIG. 3 is a block diagram illustrating an example of a method of circuit bonding using BTA-coated copper leads according to the present disclosure.

FIG. 3 is a block diagram illustrating an example of a method 330 of circuit bonding using BTA-coated copper leads according to the present disclosure. Unless explicitly stated, the method embodiments described herein are not constrained to a particular order or sequence. Additionally, some of the described method embodiments, or elements thereof, can occur or be performed at the same, or substantially the same, point in time.

Bonding of copper and gold in an interconnect circuit includes pre-heating to a first temperature gold electrical connection points on a die, as shown in block 332 of FIG. 3. In some embodiments, such pre-heating can be performed by pre-heating the die to a first temperature, the die having gold electrical connection points at particular locations. For example, pre-heating can be performed such that the gold electrical connection points have a temperature in a range of from 185 to 195 degrees Celsius.

Either before, during, or after the gold electrical connection points are pre-heated to the first temperature, bonding of copper and gold in an interconnect circuit includes aligning BTA-coated copper leads of the flex circuit with the gold electrical connection points on the die, as shown in FIGS. 1, 2A-2B, and block 335 of FIG. 3 (e.g., at particular locations of the gold electrical connection points on the die). In various embodiments, the copper leads can be coated with a monolayer of BTA molecules to prevent corrosion of the copper leads prior to bonding of the copper and gold.

As shown in block 337 of FIG. 3, bonding the BTA-coated copper leads and the gold electrical connection points includes applying an elevated second temperature to the BTA-coated copper leads at the gold electrical connection points to form the interconnect circuit. For example, bonding the BTA-coated copper leads and the gold electrical connection points can include applying the second temperature in a range of from 520 to 540 degrees Celsius to the BTA-coated copper leads on the flex circuit aligned with the gold electrical connection points on the die (e.g., at the particular locations of the gold connection points).

Applying the elevated second temperature can, for example, be performed by contacting a particular BTA-coated copper lead at a particular location of a particular gold electrical connection point with a bonding tool having an elevated temperature (e.g., in a range of from 520 to 540 degrees Celsius). Contact with the bonding tool can elevate the temperature of an area of contact between the particular BTA-coated copper lead and the particular gold electrical connection point until the temperature of the area of contact is elevated to the second temperature in the range of from 520 to 540 degrees Celsius. In some embodiments, the second temperature in the range of from 520 to 540 degrees Celsius can be applied for a dwell time of approximately 300 milliseconds.

Bonding the BTA-coated copper leads and the gold electrical connection points can include applying a pressure in a range of from 390.0 to 1180.0 kPa to the BTA-coated copper leads on the flex circuit aligned with the gold electrical connection points on the die (e.g., at the particular locations of the gold connection points), for example as shown in FIG. 2B. In some embodiments, the pressure in the range of from 390.0 to 1180.0 kPa can be applied for a dwell time of approximately 300 milliseconds. Moreover, the second temperature in the range of from 520 to 540 degrees Celsius and the pressure in the range of from 390.0 to 1180.0 kPa can be applied sequentially in either order, for overlapping periods of time, or substantially simultaneously (e.g., for the dwell time of approximately 300 milliseconds).

Utilizing the process parameters described herein, as confirmed by electron microscopy of the bond and thermal analysis of solidification, a eutectic bond is formed between the BTA-coated copper leads and gold electrical connection points at particular locations on the semiconductor die. A eutectic bond is a mixture of atoms, grains, and/or crystals of at least two dissimilar metals that form an alloy between two structures formed from the at least two dissimilar metals. When a non-eutectic alloy solidifies, its components solidify at different temperatures, exhibiting a plastic melting range. However, a eutectic alloy solidifies at a single, sharp temperature. Moreover, the eutectic alloy has a definite melting point that is lower than with other combinations of the at least two dissimilar metals (e.g., a weld between two different metals). Such characteristics can be achieved by varying the proportions of the at least two dissimilar metals.

Hence, the process parameters described herein can effectuate, in some embodiments, eutectically bonding the BTA-coated copper leads and the gold electrical connection points by applying the elevated second temperature to the BTA-coated copper leads at the particular locations of the gold electrical connection points to form the interconnect circuit.

Previous approaches to making interconnect circuits, such as using gold for both the leads (e.g., for coating the leads) and the electrical connection points, as same are described herein, apply particular temperatures, pressures, and/or dwell times for bonding the gold of the leads and the electrical connection points. Industrially effective gold-to-gold bonding of the leads and the electrical connection points is achieved, for instance, by preheating a die having gold electrical connection points to 70 degrees Celsius. Such preheating can be followed by heating the leads and the die to 530 degree Celsius and applying a pressure of 785 kilopascals (kPa) to the leads and the die for 200 milliseconds.

However, similarly effective parameters for bonding copper leads, in particular BTA-coated copper leads, to gold electrical connection points, as described in the present disclosure, have not been previously established. Nor have such parameters been established for eutectically bonding copper leads, in particular BTA-coated copper leads, to gold electrical connection points, where the eutectic bond has a mixture of atoms, grains, and/or crystals of the two dissimilar metals that forms an alloy of copper and gold and the eutectic alloy has a definite melting point that is lower than with other combinations of copper and gold.

It has been observed that bonding utilizing various combinations of the process parameters described herein results in bonding copper leads, in particular BTA-coated copper leads, to gold electrical connection points, which also can result in eutectically bonding the copper leads, in particular BTA-coated copper leads, to the gold electrical connection points. Hence, application of the process parameters for forming such a bond, as described in the present disclosure, is both novel and non-obvious.

In accordance with the present disclosure, an ink ejection device includes a semiconductor die configured to control ink ejection elements and a flex circuit having copper leads coated with a non-gold corrosion inhibitor and electrically connected to the semiconductor die. For example, the ink ejection device can include a housing, with the semiconductor die affixed to the housing, and a reservoir in the housing for holding ink, with a plurality of ink ejection elements integrated into or affixed to the semiconductor die. The ink ejection device also can include a plurality of openings near the ink ejection elements that are operatively connected to the reservoir such that ink from the reservoir can be ejected through the openings as directed by the ink ejection elements controlled by signals from the semiconductor die.

The copper leads can be bonded to gold connection points on the semiconductor die at bond sites, where each of the copper leads at the time of bonding can be coated with a non-gold corrosion inhibitor. The copper leads can be coated with a non-gold corrosion inhibitor that includes BTA (e.g., as at least one solute in a polar solvent). For example, coating with BTA can result in the monolayer of BTA being formed on the copper leads, as described herein. Part of the coating on some or all of the copper leads can survive the bond at locations away from the bond sites.

Figure 4:
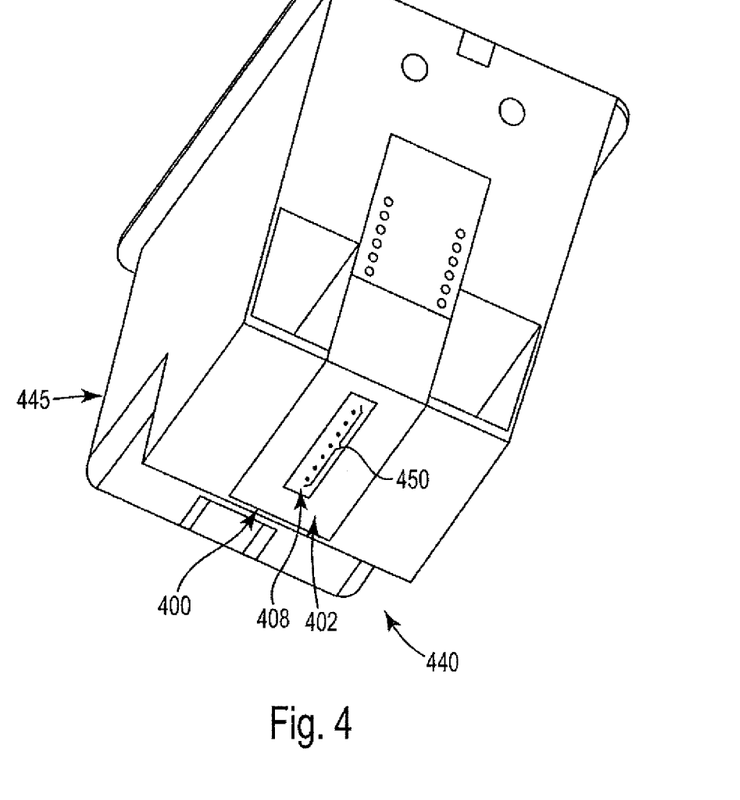
FIG. 4 illustrates an example of an ink ejection device according to the present disclosure.

FIG. 4 illustrates an example of an ink ejection device according to the present disclosure. Circuit bonding using BTA-coated copper leads can, amongst many other possible uses, be utilized in the context of manufacturing a printing apparatus or devices associated with the printing apparatus. For example, BTA-coated copper leads can reduce the cost of replacing an ink ejection device (e.g., an inkjet cartridge) by reducing the amount of gold used to coat the copper leads of the flex circuit. Alternatively or in addition, the electrical connection points located at particular locations on the die can be formed from or coated with a low resistivity element such as copper, or an alloy thereof, and can be coated with BTA.

As shown in FIG. 4, the example of the ink ejection device 440 can include a housing 445, a semiconductor die 408 configured to control ink ejection elements, and a flex circuit 402 with copper leads (not shown) bonded to the semiconductor die 408 to form an interconnect circuit 400 that is attached to the housing 445. The semiconductor die 408 can be configured to electronically control operation and timing of ink ejection elements (e.g., of continuous, thermal, and piezoelectric inkjet printers, among others) that eject ink (e.g., in the form of droplets) through apertures 450 (e.g., nozzles) of the ink ejection device 440. The ink ejection device and apertures illustrated in FIG. 4 are shown by way of example and not by way of limitation.

Inkjet cartridges have various configurations, such as having color and black inks in a single cartridge, separate cartridges for black and colored inks, or a separate cartridge for black and each of the ink colors, among other configuration possibilities. A printhead includes a series of openings (i.e., nozzles, apertures, etc.) through which ink can be ejected in the form of droplets (e.g., onto a print substrate). The cartridges of some inkjet printers can each include a printhead.

In some applications of the present disclosure, an inkjet cartridge has a housing including a reservoir therein for holding ink and a printhead affixed to the housing, the printhead having ink ejection elements operatively connected to the reservoir for ejecting ink drops from the printhead. A flex circuit having copper leads at one part of the flex circuit is connected to the printhead and has electrical contacts at another part of the flex circuit for connecting the printhead to an external circuit, the copper leads being coated with BTA and bonded to gold connection points on the printhead (e.g., after the copper leads are coated with the BTA). At the time of bonding, each of the copper leads can be coated with BTA. Part of the coating on some or all of the copper leads can survive the bond at locations away from the bond sites.

As shown in FIG. 4, the die 408 and the flex circuit 402 bonded by the interconnect circuit 400 can be attached (e.g., by adhesive) to the housing 445 of the ink ejection device 440 after a eutectic bond is formed between the copper leads and the gold electrical connection points (not shown). In some embodiments, the housing 445 can include an ink reservoir (e.g., for an inkjet cartridge)(not shown). That is, the ink ejection device 440 can include the housing 445, the semiconductor die 408 configured to control ink ejection elements that is attached to the housing 445, the flex circuit 402 with copper leads, and a eutectic bond between each of the copper leads and gold electrical connection points on the semiconductor die 408 to form the interconnect circuit 400.

Each of the copper leads can include at the time of bonding a copper lead coated with BTA and at least some of the BTA-coated copper leads can retain a BTA-coating distal from the eutectic bond with the gold electrical connection points. That is, the BTA-coating on the copper leads can be vaporized at and/or contiguous to each of the bond sites during bonding of the copper leads to the gold electrical connection points. However, the BTA-coating on other copper parts of the circuit (e.g., distal portions of the copper leads 104, the traces 112, and the electrical contact pads 116, as illustrated in FIG. 1) can remain in place before, during, and after bonding of the copper leads to the gold electrical connection points.

In some applications, circuit bonding using BTA-coated copper leads can be at least partially automated through use of appropriate machinery and machine-readable instructions. For example, a tape automated bonding (TAB) apparatus (e.g., a Sumitomo BNT IC 066022) can be set up to appropriately apply particular temperatures and/or pressures at particular time points and for particular dwell times.

The TAB apparatus (not shown) can also be set up to appropriately feed a reel of multiple flex circuits such that individual flex circuits are indexed and appropriately aligned with a number of semiconductor dies positioned on a bonding stage prior to bonding. For example, the BTA-coated copper leads of one of the plurality of flex circuits, prior to bonding, can be automatically aligned with the particular locations of the gold electrical connection points on one of a plurality of dies.

Each of the plurality of flex circuits can include a section separate from the copper leads that has BTA-coated copper electrical contact pads configured to prevent corrosion of the copper electrical contact pads before and after the interconnect circuit is formed.

Prior to introduction into the apparatus, the copper leads and/or the copper electrical contact pads of the flex circuit and/or the electrical connection points of the semiconductor die of the present disclosure can be coated with a monolayer of BTA molecules. The coating with the monolayer of BTA molecules can be formed by evaporating a solvent from a solution of BTA molecules, the BTA molecules being soluble in water and/or other polar solvents. A copper surface coated with a monolayer of BTA molecules is subsequently resistant to corrosion and is left with an inert finish suitable for further processing.

A TAB apparatus bonding tool can be set up to appropriately apply the particular temperatures and/or pressures at the particular time points and for the particular dwell times. Accordingly, a plurality of BTA-coated copper leads can be eutectically bonded substantially simultaneously (i.e., gang bonded) to gold electrical connection points at particular locations on the semiconductor die.

Figure 5:
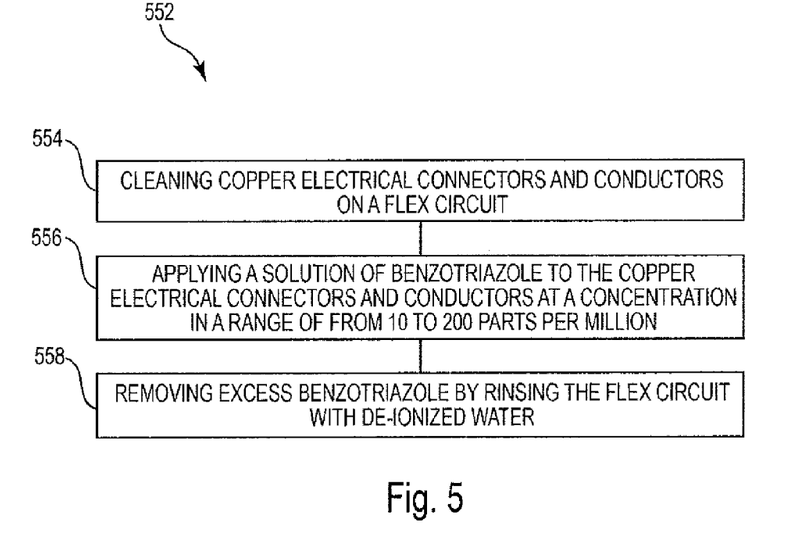
FIG. 5 is a block diagram illustrating an example of a method of coating copper electrical connectors and conductors on a flex circuit according to the present disclosure.

FIG. 5 is a block diagram illustrating an example of a method 552 for coating copper electrical connectors and conductors on a flex circuit with BTA. As used herein, copper electrical connectors and copper electrical conductors include the copper leads, traces, and contact pads, among other components, included on a flex circuit as described in the present disclosure.

Coating the copper electrical connectors and conductors on the flex circuit with BTA includes cleaning the copper electrical connectors and conductors on the flex circuit, as shown in block 554 of FIG. 5. Cleaning can include removing oxidized copper from the copper electrical connectors and conductors before coating the copper electrical connectors and conductors with BTA.

For example, cleaning the copper electrical connectors and conductors can be performed by applying an acid to the copper electrical connectors and conductors on the flex circuit. Such acids can include, but are not limited to, sulfuric acid and hydrochloric acid. An aqueous solution of sulfuric acid and de-ionized water can be used, where the sulfuric acid is present in a range of from 1.0 to 20 percent by weight, with the balance being de-ionized water. Alternatively, or in addition, an aqueous solution of hydrogen chloride and de-ionized water can be used, where the hydrogen chloride is added in a range of from 1.0 to 20 percent by weight to de-ionized water to form hydrochloric acid.

Cleaning the copper electrical connectors and conductors can also be performed by applying a microetchant to the copper electrical connectors and conductors on the flex circuit. The microetchant can be used when high oxidation levels are present on the copper electrical connectors and conductors (e.g., forming an oxidized layer of copper). Such microetchants can include, but are not limited to, ammonimum, sodium, potassium persulfate, and hydrogen peroxide in combination with sulfuric acid. Application of the microetchant can result in removal of a layer of copper from the copper electrical connectors and conductors, thus removing oxidation that has formed on the copper.

Application of the microechant, however, can cause a layer of oxide residue to form on the surface of the copper electrical connectors and conductors. Removal of the layer of oxide residue can be accomplished by applying an acid to the copper electrical connectors and conductors, as described herein. Such acids can include, but are not limited to, sulfuric acid and hydrochloric acid, as previously described.

Application of the acid and/or the microetchant to the copper electrical connectors and conductors on the flex circuit can be performed in a number of ways. The acid and/or microetchant can be applied to the copper electrical connectors and conductors by, for example, spraying, localized placement of droplets, and dipping, among other application techniques.

After the copper electrical connectors and conductors have been cleaned, coating copper electrical connectors and conductors on the flex circuit with BTA can include rinsing the copper electrical connectors and conductors with de-ionized water. Rinsing the copper electrical connectors and conductors with de-ionized water can be performed by, for example, spraying the flex circuit with de-ionized water and/or dipping the flex circuit in a bath of de-ionized water, among other rinsing techniques.

As shown in block 556 of FIG. 5, coating copper electrical connectors and conductors on the flex circuit with BTA includes applying a solution of BTA to the copper electrical connectors and conductors at a concentration in a range of from 10 to 200 parts per million relative to a polar solvent. Applying a solution of BTA can include applying the BTA in an aqueous solution of de-ionized water and BTA. BTA can be procured in a powder form and mixed with de-ionized water to form the aqueous solution of de-ionized water and BTA. A solution of BTA can also be formed by mixing BTA with a polar solvent other than water. The amount of BTA mixed with the de-ionized water and/or another polar solvent can be adjusted so as to reach the concentration in the range of from 10 to 200 parts per million. Higher concentrations of BTA are also usable. To achieve high concentrations of BTA, increased temperatures may be applied to the solution of BTA to cause the BTA to dissolve. The temperature of the solution of BTA can be adjusted to a temperature in a range of from 25 to 50 degrees Celsius. The temperature of the solution of BTA can be adjusted, for example, by using a heated tank and/or passing the solution of BTA through a heat exchanger, among other heating techniques.

The application of the solution of BTA to the copper electrical connectors and conductors results in BTA contacting the copper and complexing with the copper, thereby forming an organometallic finish on the copper electrical connectors and conductors. The complexing of BTA with the copper subsequently can result in a monolayer of BTA molecules being formed on the copper electrical connectors and conductors.

Applying the solution of BTA to the electrical connectors and conductors can include spraying the solution of BTA over the copper electrical connectors and conductors on the flex circuit. The solution of BTA can be sprayed over the copper electrical connectors and conductors for an exposure time in a range of from 3.0 to 20 seconds. Longer exposure times are also possible. For example, the solution of BTA can be sprayed through nozzles over a continuous reel of multiple flex circuits that passes through the spray. In addition or as an alternative, BTA can also be applied to the copper electrical connectors and conductors by dipping the flex circuit in the solution of BTA and/or by localized placement of droplets of the solution of BTA, among other application techniques (e.g., vapor deposition).

As shown in block 558 of FIG. 5, coating copper electrical connectors and conductors on the flex circuit with BTA includes removing excess BTA by rinsing the flex circuit with de-ionized water. Rinsing with de-ionized water can remove the excess BTA that is not complexed with the copper. Rinsing the copper electrical connectors and conductors with de-ionized water can be performed by, for example, spraying the flex circuit with de-ionized water and/or dipping the flex circuit in a bath of de-ionized water, among other removal techniques.

Subsequently, polar solvent (e.g., de-ionized water) that remains on the copper electrical connectors and conductors can be removed, thus coating the copper electrical connectors and conductors with a monolayer of BTA to prevent corrosion of the copper on the flex circuit. Removal can be performed, for example, by using a squeegee to remove polar solvent from the surface of the copper electrical connectors and conductors on the flex circuit. Use of a squeegee, however, can result in a remainder of the polar solvent being left associated with the copper electrical connectors and conductors.

De-ionized water and other polar solvents can evaporate when heated air is passed over the surface of the copper electrical connectors and conductors. Hence, after removal of most of, for example, the de-ionized water from the surface of the copper electrical connectors and conductors has been performed, air heated to around 50 degrees Celsius can be passed over the surface of the copper electrical connectors and conductors to evaporate the remainder of the de-ionized water. As a result, the monolayer of BTA can be left on the copper electrical connectors and conductors on the flex circuit.

As the flex circuits pass through the sprayed solution of BTA, an amount of BTA complexes with the copper electrical connectors and conductors, as described herein. Dilution with the polar solvent during rinsing can also cause the concentration of BTA to decrease. This can cause a concentration of BTA in a collected solution of BTA to decrease after a period of time. Also, any excess solution of BTA that does not contact the copper electrical connectors and conductors in the first place can be collected. These sources of excess BTA can, for example, be collected individually or collectively in a number of recycle tanks and thereafter be recycled as a recycled solution of BTA through the spray nozzles by use of a pump located in each of the recycle tanks. To compensate for the decreased concentration of BTA, an automatic dosing system can be used to introduce BTA into the recycled solution of BTA, for example, once the concentration of BTA in the solution of BTA reaches a predetermined level.

In conclusion, while the present disclosure has been particularly shown and described with reference to various embodiments, those skilled in the art will understand that many variations may be made herein without departing from the spirit and scope of the disclosure as defined in the following claims. This disclosure should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Whereas the claims recite "a" or "a first" element or the equivalent thereof, such claims should be understood to include incorporation of one or more such elements, neither requiring nor excluding two or more such elements.

What is claimed is:

1. An ink ejection device, comprising:
a semiconductor die configured to control ink ejection elements; and
a flex circuit having copper leads, the copper leads separately coated with a non-gold corrosion inhibitor comprising benzotriazole and electrically connected to the semiconductor die.

2. The device of claim 1, where:
the copper leads are bonded to gold connection points on the semiconductor die at bond sites;
each of the copper leads comprises, at the time of bonding, a copper lead coated with a non-gold corrosion inhibitor; and
part of the coating on some or all of the leads survives the bond at locations away from the bond sites.

3. The device of claim 1, where the non-gold corrosion inhibitor comprises a monolayer of benzotriazole.

4. The device of claim 1, further comprising:
a housing, the semiconductor die affixed to the housing;
a reservoir in the housing for holding ink;
a plurality of ink ejection elements integrated into or affixed to the semiconductor die; and
a plurality of openings near the ink ejection elements and operatively connected to the reservoir such that ink from the reservoir is ejected through the openings as directed by the ink ejection elements.

5. An inkjet cartridge, comprising:
a housing including a reservoir therein for holding ink;
a printhead affixed to the housing, the printhead having ink ejection elements operatively connected to the reservoir for ejecting ink drops from the printhead; and
a flex circuit having copper leads at one part of the flex circuit connected to the printhead and electrical contacts at another part of the flex circuit for connecting the printhead to an external circuit, the copper leads being coated with benzotriazole and bonded to gold connection points on the printhead.

6. The inkjet cartridge of claim 5, where:
each of the copper leads comprises, at the time of bonding, a copper lead coated with benzotriazole; and
part of the coating on some or all of the copper leads survives the bond at locations away from the bond sites.

7. An ink ejection device, comprising:
a housing;
a semiconductor die configured to control ink ejection elements that is attached to the housing;
a flex circuit with copper leads; and
a eutectic bond between each of the copper leads and gold electrical connection points on the semiconductor die to form an interconnect circuit.

8. The device of claim 7, where the housing includes an ink reservoir.

9. The device of claim 7, where each of the copper leads comprises, at the time of bonding, a copper lead coated with benzotriazole (BTA) and at least some of the BTA-coated copper leads retain a BTA-coating distal from the eutectic bond with the gold electrical connection points.

10. The device of claim 7, where the flex circuit includes a section separate from the copper leads that has BTA-coated copper electrical contact pads configured to prevent corrosion of the copper electrical contact pads before and after the interconnect circuit is formed.

* * * * *